United States Patent [19]
Tracy

[11] Patent Number: 5,176,102
[45] Date of Patent: Jan. 5, 1993

[54] PET CARRIER

[76] Inventor: Lynn Tracy, P.O. Box 211, Dewitt, N.Y. 13214

[21] Appl. No.: 853,588

[22] Filed: Mar. 18, 1992

[51] Int. Cl.⁵ .............................................. A01K 1/00
[52] U.S. Cl. ....................................... 119/19; 224/209
[58] Field of Search ................. 119/96, 19; 224/209, 224/210, 211

[56] References Cited

U.S. PATENT DOCUMENTS

| | | | |
|---|---|---|---|
| 2,421,244 | 5/1947 | Diaber | 224/210 X |
| 2,517,757 | 8/1950 | Adlerstein | 224/210 X |
| 3,019,952 | 2/1962 | Brewster | 224/209 X |
| 4,420,103 | 12/1983 | Douglass | 224/209 X |
| 4,593,841 | 6/1986 | Lange | 224/210 X |
| 4,648,121 | 3/1987 | Lowe | 224/209 X |

Primary Examiner—Gene Mancene
Assistant Examiner—Thomas Price
Attorney, Agent, or Firm—Katherine McGuire

[57] ABSTRACT

A pet carrier worn about the human torso comprises a rigid, planar bottom with flexible fabric walls extending upwardly therefrom to form a pouch with an open top into which a pet may be seated with the head exposed at the open top. A pair of shoulder and waist straps attach to the pouch and platform, respectively, to secure the carrier to the body with the pouch positioned adjacent the abdomen and the platform extending perpendicular thereto.

5 Claims, 2 Drawing Sheets

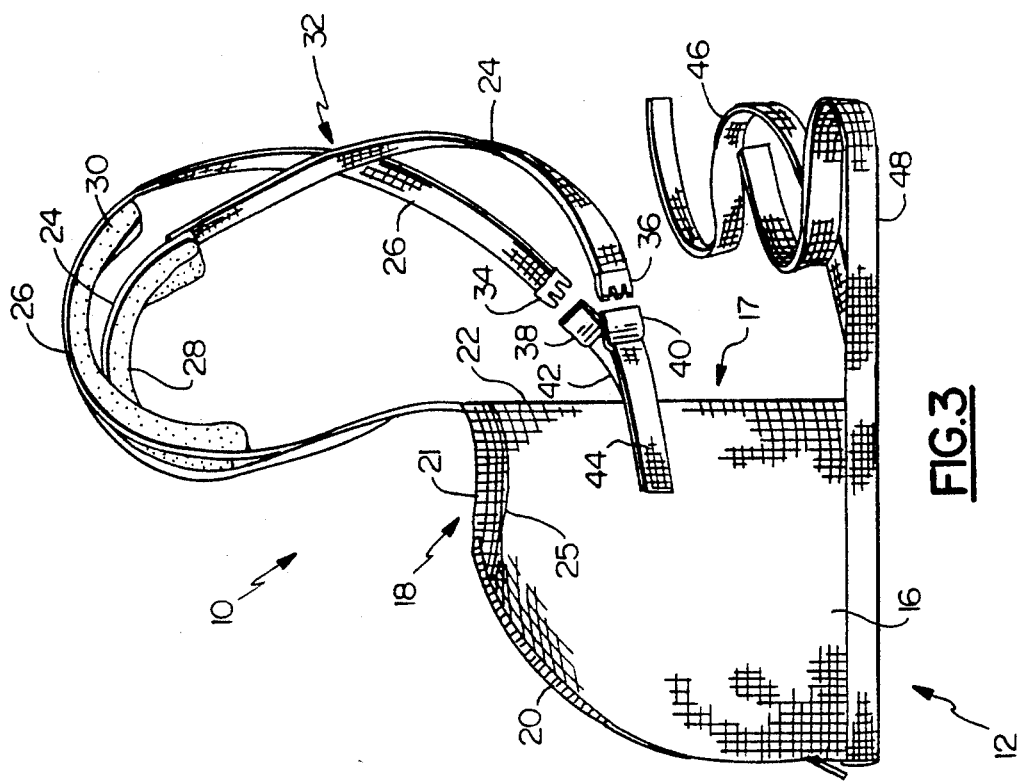
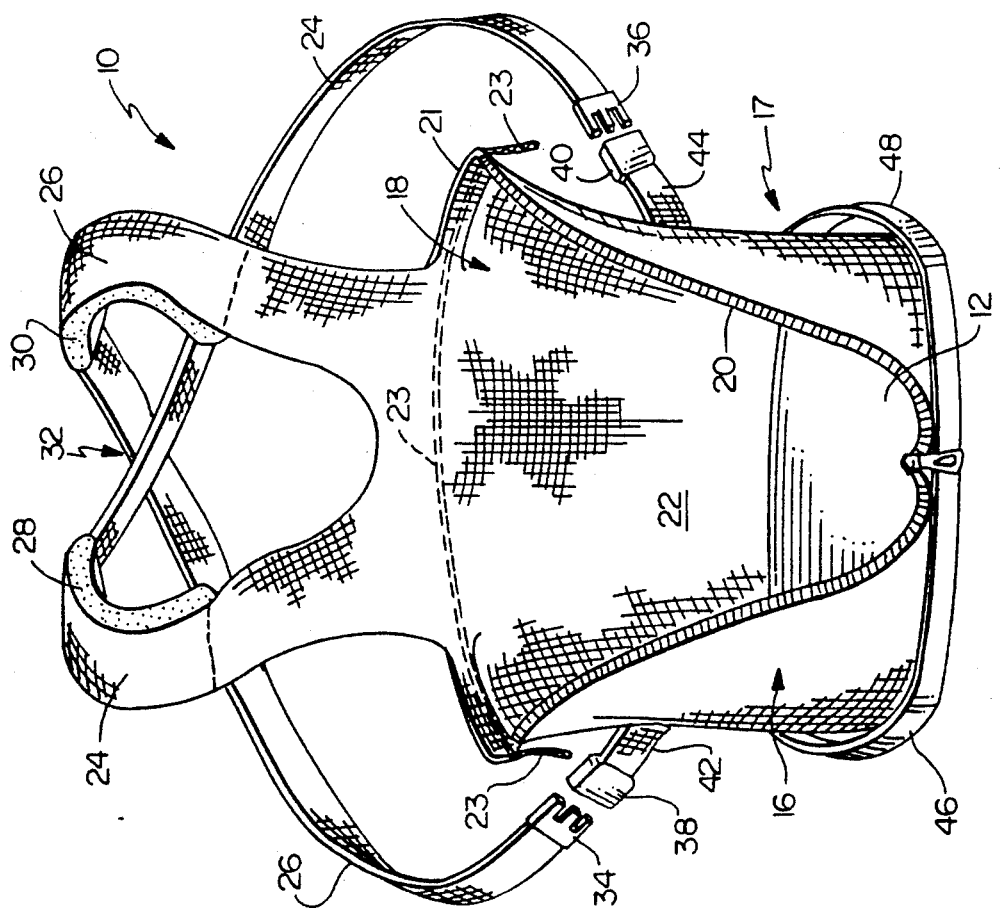

PET CARRIER

BACKGROUND OF THE INVENTION

This invention relates to pet carriers which are worn about the human torso and which may securely hold and carry a small pet as the person walks and moves about.

Most owners of small dogs, cats and other domestic animals like to take their pet with them on walks and small hikes. Many times, however, the terrain becomes too rough and hazardous for the pet to walk on or the pet simply becomes too tired to continue the walk. In this instance, the pet owner would usually pick the pet up and carry it in his/her arms. Various types of pet carriers have been developed which permit the pet owner to carry the pet in a relatively uncumbersome manner. For example, U.S. Pat. No. 4,977,857 which issued to Slawinski on Dec. 18, 1990 discloses a pet carrier bag which includes handle straps and wheels on its base so that the pet and bag may be either carried by the handle straps or wheeled along the ground by the owner.

Other types of pet carriers of the handle carrying type may be seen in U.S. Pat. No. 4,644,902 issued to Doyle on Feb. 24, 1987; U.S. Pat. No. 4,220,119 issued to Albright on Sep. 2, 1980; U.S. Pat. No. 3,850,144 issued to Springer on Nov. 26, 1974; and U.S. Pat. No. 4,852,520 issued to Goetz on Aug. 1, 1989.

All of the above mentioned carriers utilize handles which are manually grasped when carrying the pet. Depending on the weight of the pet, it is obvious that the owner could become quickly fatigued carrying the pet in this manner.

SUMMARY OF THE INVENTION

It is therefore a main object of the present invention to provide a pet carrier for relatively small domestic animals such as dogs and cats which may be worn about the torso of the individual.

It is a further object of the present invention to provide a pet carrier which allows the pet to sit in an upright position with its head exposed to permit maximum comfort and vision for the pet while also restraining the body of the pet in the carrier.

It is another object of the present invention to provide a pet carrier which is quick and simple to put on and take off of the person and is comfortable to wear and carry a pet in.

Other objects will in part be obvious and in part appear hereinafter.

In accordance with the foregoing objects, the invention comprises a pet carrier supported and carried by the person which holds and carries the pet presumably at the front of the person adjacent the abdomen. The carrier includes a rigid platform with a flexible material wall encircling the perimeter thereof and extending upwardly to form an open top. A pouch is thus formed with a rigid bottom into which a pet is deposited for carrying. The pouch wall includes a front zipper to facilitate the deposit and removal of the pet into and from the carrier, respectively.

A first pair of shoulder straps attach to and extend from the back edge of the top opening which are placed over the shoulders and criss-cross at the back of the person. The free ends of the shoulder strap include releasable securing means which engage with like releasable securing means attached to opposite sides of the pouch walls.

A second pair of waist straps attach to and extend from the platform, the free ends of which may be guided around opposite sides of the person's waist and tied at the back. In this way, the carrier is comfortably secured to the individual with the pouch in the front and the platform extending substantially perpendicular to the person adjacent the abdomen to provide a sturdy seat and enclosure for the pet.

BRIEF DESCRIPTION OF THE DRAWINGS

FIG. 2 is the view of FIG. 1 with the pouch shown open and empty; and

FIG. 3 is a side, elevational view of the pet carrier with the pouch shown open and empty.

DETAILED DESCRIPTION

Figure 1:
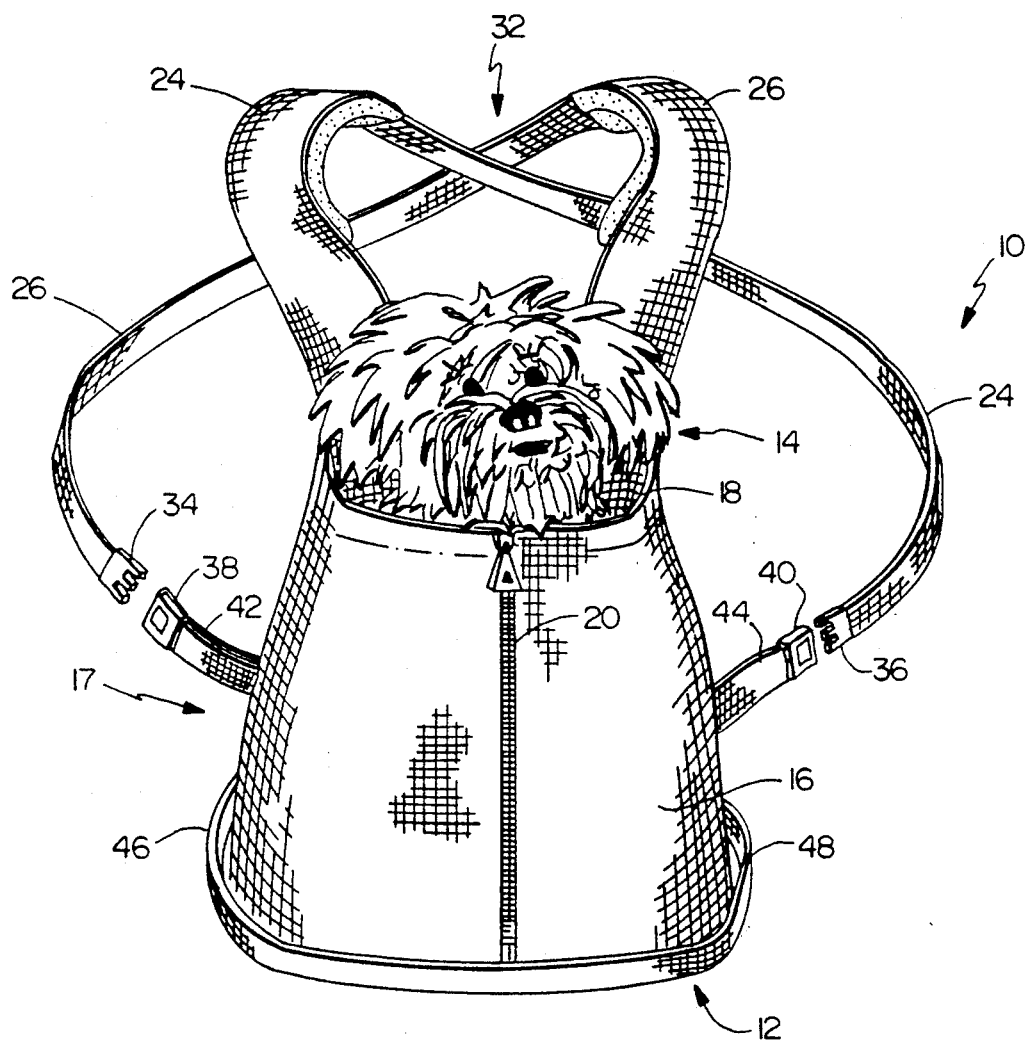
FIG. 1 is a front elevational view of the pet carrier with a small dog deposited therein in the intended manner.

Referring now to the drawings, there s seen in FIGS. 1-3 the pet carrier denoted generally by the reference numeral 10. Carrier 10 is worn and carried upon the torso of an individual in much the same manner as an infant carrier. Carrier 10 comprises a rigid, planar platform 12 (seen best in FIG. 2) which preferably includes padded cushioning such as foam onto which a pet such as a dog 14 (FIG. 1) is seated when deposited into and carried by carrier 10. Platform 12 may be made of any suitable light-weight, rigid material and of any outline such as square, rectangular, or oval as seen in the Figures.

The enclosure for the pet 14 is formed by a flexible material wall 16 which completely encircles the perimeter of platform 12, extending upwardly therefrom to form a pouch 17 with an open top 18. The front of pouch 17 faces in a direction away from the person's body when carrier 10 is donned in the intended manner and is seen to include a zipper 20 extending from platform 12 to the top edge 21 of pouch wall 16. Zipper 20 is provided to facilitate the deposit and removal of pet 14 into and out of pouch 17, respectively. A drawstring 23 (FIG. 2) may be incorporated into top edge 21 to adjust the size of opening 18 or possibly an elastic gather 25 (FIG. 3). Drawstring 23 and elastic gather 25 may be used in combination with zipper 20 or separately as desired.

The opposite, rear panel 22 of pouch wall 16 lays against the abdomen of the person with platform 12 extending perpendicular thereto. Pouch 17 and platform 12 are supported upon the body by a pair of shoulder straps 24 and 26 which integrally extend from top edge 21 at back panel 22 of pouch 17. Padded sections 28 and 30 are stitched or otherwise attached to the undersides of straps 24 and 26, respectively, to provide cushioning for the shoulders which bear the brunt of the weight of carrier 10 and pet 14. Straps 24 and 26 criss-cross at point 32 which would be at the back of the person, and extend under the opposite arm. The free ends of straps 24 and 26 include securing elements 34 and 36, respectively, which releasably engage with respective securing elements 38 and 40 attached to the respective ends of straps 42 and 44 which attach to and extend from opposite sides of pouch wall 16.

Pouch 16 and platform 12 are stabilized relative to the wearer's body by a pair of waist straps 46 and 48 which attach to and extend from opposite sides of platform 12.

Straps 46 and 48 are of a length which permits them to wrap around the waist and tie at the back.

Although not shown in the drawings, it is intended that shoulder straps 24 and 26 be equipped with means to adjust the lengths thereof to provide a secure fit for most any size person. Other modifications such as elastic gathers or a drawstring may be incorporated into pouch top 21 to adjust the size of opening 18 through which pet 14 extends his head while sitting in pouch 16. It will be appreciated that platform 12 provides a sturdy seat such that pet 14 may position itself in a comfortable sitting position while being carried. Pouch 16 may also be formed of any sturdy flexible material such as nylon or canvas, for example.

What is claimed is:

1. A carrier for a pet worn and carried about the torso of an individual, said carrier comprising:
   a) a substantially planar, rigid platform of predetermined outline upon which said pet sits when deposited in said carrier;
   b) a flexible fabric wall attached to and encircling the perimeter of said platform, said wall extending upwardly therefrom to form a pouch with an open top with said platform comprising the bottom of said pouch;
   c) first and second shoulder straps integrally formed with and extending from the perimeter of said flexible fabric wall at said pouch open top adjacent each other, said first and second shoulder straps having free ends including first and second securing elements which releasably engage with third and fourth securing elements attached to opposite sides of said pouch, respectively, said first and second shoulder straps integrally connected to each other at the point where said first and second straps integrally extend from said perimeter of said pouch open top; and
   d) the portion of said fabric wall extending below said first and second shoulder straps comprising the back wall of said carrier and being positioned against said torso and the portion of said fabric wall opposite said back wall comprising the front wall, and further comprising a zipper having first and second tracks extending from said platform to said open top at said front wall forming an opening in said front wall movable between closed and open positions.

2. The invention according to claim 1 and further comprising first and second waist straps attached to and extending from opposite sides of the perimeter of said platform in a direction rearward from said front wall, said waist straps having free ends for tying together at the back of said individual when said carrier is donned with said pouch positioned adjacent the abdomen of said individual with said platform extending substantially perpendicular thereto.

3. The invention according to claim 2 wherein said platform and said shoulder straps include cushioning.

4. The invention according to claim 2 wherein said flexible fabric wall includes a drawstring at said open top, said drawstring extending through said fabric wall back wall adjacent said first and second straps, said drawstring having first and second ends extending from said fabric wall at said first and second tracks of said zipper, respectively, said zipper and said drawstring together cooperatively operable to adjust the size of said pouch about said pet situated therein.

5. The invention according to claim 2 wherein said flexible fabric wall includes elastic gathers at said open top.

* * * * *